(12) United States Patent
Rappold et al.

(10) Patent No.: US 10,539,954 B2
(45) Date of Patent: Jan. 21, 2020

(54) DESCRIPTION OF AN ACTUATING DEVICE FOR MOVING AN ACTUATOR

(71) Applicant: Hella KGaA Hueck & Co., Lippstadt (DE)

(72) Inventors: Sven Rappold, Geseke (DE); Peter Rölleke, Soest (DE); Andreas von Chamier-Cieminski, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 146 days.

(21) Appl. No.: 15/315,455

(22) PCT Filed: Jul. 28, 2015

(86) PCT No.: PCT/EP2015/067253
§ 371 (c)(1),
(2) Date: Dec. 1, 2016

(87) PCT Pub. No.: WO2016/016231
PCT Pub. Date: Feb. 4, 2016

(65) Prior Publication Data
US 2017/0131708 A1    May 11, 2017

(30) Foreign Application Priority Data
Jul. 29, 2014    (DE) .......................... 10 2014 110664

(51) Int. Cl.
*G05B 23/02*      (2006.01)
(52) U.S. Cl.
CPC ................................ *G05B 23/0245* (2013.01)

(58) Field of Classification Search
CPC .................................................. G05B 23/0245
(Continued)

(56) References Cited

U.S. PATENT DOCUMENTS 3,491,277 A * 1/1970 Brainard .............. G05B 19/351
318/162
5,678,671 A * 10/1997 Leimbach ............. B60T 13/745
192/114 R
(Continued)

FOREIGN PATENT DOCUMENTS

DE           10325890 A1    12/2004
DE    10 2006 055747 A1     5/2008
(Continued)

OTHER PUBLICATIONS

Judy, Jack W., and Richard S. Muller. "Magnetically actuated, addressable microstructures." Journal of Microelectromechanical systems 6.3 (1997): pp. 249-256. (Year: 1997).*
(Continued)

*Primary Examiner* — Satish Rampuria
(74) *Attorney, Agent, or Firm* — Husch Blackwell LLP

(57) ABSTRACT

An actuating device for moving an actuator that features an actuating drive for generating an actuating movement for the actuator. The actuating device also includes a transmission device for transmitting the actuating movement from the actuating drive to the actuator. It also features a sensor device for detecting the actuating position of the actuator. The sensor device features a signal receiver and transducer. The signal receiver will be in the actuating drive and the transducer configured as part of the transmission device.

7 Claims, 2 Drawing Sheets

(58) Field of Classification Search
USPC .................................................. 700/275–306
See application file for complete search history.

(56) References Cited

U.S. PATENT DOCUMENTS

| | | | | |
|---|---|---|---|---|
| 6,437,771 | B1* | 8/2002 | Rosenberg | A63F 13/06 345/156 |
| 6,778,867 | B1* | 8/2004 | Ziegler | B25J 9/1674 318/563 |
| 7,420,362 | B2* | 9/2008 | Gurich | F02M 59/44 324/207.19 |
| 7,584,643 | B2* | 9/2009 | Hoffman | G05B 23/0256 73/1.72 |
| 7,826,906 | B2* | 11/2010 | Gough | G05B 15/02 700/19 |
| 8,332,071 | B2* | 12/2012 | Zeltzer | G05B 19/401 700/250 |
| 2007/0063971 | A1* | 3/2007 | Vecerina | G09B 23/285 345/156 |
| 2008/0125885 | A1* | 5/2008 | McNutt | G05B 19/054 700/81 |
| 2009/0204260 | A1* | 8/2009 | Bryne | B05B 13/0292 700/259 |
| 2010/0185324 | A1* | 7/2010 | Ferrara | B25J 9/1638 700/245 |
| 2015/0224638 | A1* | 8/2015 | Dockter | B25J 3/04 700/264 |

FOREIGN PATENT DOCUMENTS

| | | |
|---|---|---|
| DE | 10 2007 016817 A1 | 10/2008 |
| DE | 202009018219 U1 | 5/2011 |
| EP | 1514990 A2 | 3/2005 |
| EP | 1 832 757 A2 | 9/2007 |

OTHER PUBLICATIONS

Taylor, William P., Oliver Brand, and Mark G. Allen. "Fully integrated magnetically actuated micromachined relays." Journal of Microelectromechanical Systems 7.2 (1998): pp. 181-191. (Year: 1998).*

Poupyrev, Ivan, Tatsushi Nashida, and Makoto Okabe. "Actuation and tangible user interfaces: the Vaucanson duck, robots, and shape displays." Proceedings of the 1st international conference on Tangible and embedded interaction. Acm, 2007.pp. 205-212 Year: 2007).*

Wagner, B., and W. Benecke. "Microfabricated actuator with moving permanent magnet." [1991] Proceedings. IEEE Micro Electro Mechanical Systems. IEEE, 1991. pp. 27-32 (Year: 1991).*

Amditis, Angelos, Panagiotis Lytrivis, and Evangelia Portouli. "Sensing and actuation in intelligent vehicles." Handbook of Intelligent Vehicles (2012): pp. 31-60. (Year: 2012).*

Croke, Steven, and Jack Herrenschmidt. "More electric initiative-power-by-wire actuation alternatives." Proceedings of National Aerospace and Electronics Conference (NAECON'94). IEEE, 1994. pp. 1338-1346 (Year: 1994).*

* cited by examiner

DESCRIPTION OF AN ACTUATING DEVICE FOR MOVING AN ACTUATOR

CROSS REFERENCE

This application claims priority to PCT Patent Application No. PCT/EP2015/067253, filed 28 Jul. 2015, which itself claims priority to German Application No. 10 2014 110664.4, filed 29 Jul. 2014, the entirety of both of which are hereby incorporated by reference.

FIELD OF THE INVENTION

This invention consists of an actuating device for moving an actuator and an actuator system with a corresponding actuating device and corresponding actuator.

BACKGROUND OF THE INVENTION

It is common knowledge that actuating devices are commonly used in vehicles to transmit actuating movements to actuators. This may include a shutter device for a vehicle's radiator grille. This type of actuator is used to move back and forth between at least two positions. As is typical, an actuating drive is provided which generates the corresponding actuating movement for the actuator. The servomotor (usually an electric motor) generates the required force to carry out this positioning movement. A sensor device is normally included with conventional actuating devices to ensure that the actuating movement is actually carried out as intended and to control or even regulate the actuating movement. The sensor device is part of the actuating drive. Thus, it can ensure that the actuating drive performs the actuating movement. This enables the sensor device to provide feedback specifying the current position of the actuating drive.

A disadvantage of conventional solutions is that the only method that can be employed by the sensor device to record feedback regarding the real actuating position of the actuator is extremely indirect. This means that the end point and real actuating position are not recorded by the sensor device. Instead, this device records the correlating actuating position at the other end of the drive chain (namely, the actuating drive). Accordingly, any negative interference that may be present during transmission of the actuating movement from the actuating drive to the actuator is not recorded by conventional sensor devices. In the worst case scenario, this can cause issues such as a mechanical defect in a transmission device between the actuating drive and actuator in the form of a rupture. In such cases, although the actuating drive can still carry out the actuating movement without any issues, the actuator can no longer move from its current, corresponding actuating position. As a result, this defect cannot be detected by conventional actuating devices and the corresponding sensor device.

SUMMARY OF THE INVENTION

The purpose of this invention is to remedy at least some of the aforementioned disadvantages. The main task of this invention is to improve diagnostics of defects in the actuating device in an easy and cost-effective manner.

This task is accomplished by using an actuating device with the features from claim 1 and an actuator system with the features from claim 10. Additional features and details of the invention can be found in the subclaims, description and drawings. Of course, the described features and details that refer to the inventive actuating device also apply to the inventive actuator system, and vice versa. This ensures that any disclosed information regarding individual aspects of the invention may be understood as referring to either the actuating device or the actuator system.

An inventive actuating device is used to move an actuator. For this reason, the actuating device features an actuating drive used to generate an actuating movement for the actuator. A transmission device, which transmits the actuating movement from the actuating drive to the actuator, is also provided. An inventive actuating device also includes a sensor device for detecting the actuating position of the actuator. Invention specifications stipulate that the actuating device's sensor feature a signal receiver and transducer. According to these specifications, the signal receiver is in the actuating drive and the transducer forms part of the transmission device.

As such, an inventive actuating device uses the basic technology of conventional actuating devices as its basis. An actuator is also specially equipped with a servomotor, which generates and transmits the necessary actuating force to carry out the actuating movement. This actuating movement and the associated actuating force can be transmitted to the actuator via a transmission device, which may be configured as a gear, lever control or rod. As a result, a corresponding actuating movement during actuating drive operation can move the actuator into different actuating positions.

Just like conventional actuating devices, the inventive actuating device features a basic sensor device that can detect the actuating position of the actuator. Nevertheless, this sensor device differs from conventional actuating devices in an important way. Invention specifications for the actuating device explicitly stipulate that there be a separation of the signal receiver and transducer for the sensor device. While the signal receiver forms part of the actuating drive, the transducer part of the transmission device and is separate from the actuating drive. In other words, the actuating movement generated by the actuating drive now allows this actuating movement to be generated by the transmission device. This means that the transducer designed as part of this transmission device also carries out the actuating movement. This actuating movement of the transmission device is then detected by the signal receiver from the correlating actuating movement of the transducer, allowing the corresponding actuating position to be detected by the sensor device.

The separation of the sensor device expands the diagnostic scope compared to conventional solutions. This means that defects can now be detected in both the actuating drive and the transmission device without error. Even in cases where the function of the actuating drive is in no way impeded, the sensor device can still detect any mechanical defects, such as a rupture, in the transmission device. If the actuator moves and the corresponding actuating movement of the transmission device is only partially carried out or not at all, this difference is detected by the signal receiver from a corresponding difference in the movement of the transducer. This enables the sensor device to receive and evaluate corresponding information about this difference. From a mechanical perspective, the actuator and transmission device can frequently be thought of as a movement unit. This is because the transmission device is often in direct operative contact with the corresponding actuator for mechanical transmission. Since only an actuator interface or movement interface defining and, specifically, fixing information in one way is provided between the transmission device and actuator, a defect within the transmission device is equivalent to a movement defect in the actuator.

For example, if the actuator is blocked by an outside mechanical influence (such as falling rocks striking the device, resulting in a blockage in the shutter device for the vehicle's radiator grille), this means that the movement can also not be carried out by the transmission device. This also reflects corresponding feedback regarding the correlation of the corresponding transducer movement, ensuring that this type of defect can be definitively detected by an inventive actuating device.

Unlike a solution in which the entire sensor device (the signal receiver and transducer) has to be separated from the actuating device in order to enable signal detection right at the actuator, an inventive actuating device has the same compact design as conventional actuating devices. Nevertheless, even when this low level of complexity is retained, the diagnostic scope of an inventive actuating device can be expanded considerably with respect to detectable defects and errors in the actuating device. This expansion of the diagnostic options does not increase the complexity or the cost of the actuating device, making it especially easy to achieve the corresponding inventive functions.

This type of signal communication that occurs between a signal receiver and a transducer enables corresponding detection of the actuator's actuating position (preferably, in a one-to-one correspondence). As such, the type of communication between the signal receiver and transducer does not affect the functional advantage of this invention in any way. This means that magnetic, resistive and inductive communication are just as likely to be used for signal communication as optical or even mechanical signal communication.

It may be an advantage if the actuator of an inventive actuating device features a printed circuit board on which the signal receiver is arranged. This type of printed circuit board is usually an essential part of an actuating drive. A corresponding control unit for controlling and/or regulating the actuating drive, specifically a corresponding servomotor, is arranged on the printed circuit board. As such, the printed circuit board is an existing component that the signal receiver can now feature. The signal receiver intercepts signals from the transducer. Of course, the transducer can also carry out active functions such as generating an eddy current field, specifically when it uses inductive signal communication. This is all possible without increasing the complexity of the actuating drive because both the necessary control function for the actuating drive and the corresponding sensor function for the signal receiver can be configured on the same corresponding printed circuit board. This further reduces the complexity and expenditures for configuring an inventive actuating device.

It may be another potential advantage to arrange the transducer of an inventive actuating device on a component of the transmission device that moves during the actuating movement. This means that, for example, the transmission device is configured as a transmission lever control. The movement of the individual levers of this lever control during the actuating movement correspond to the bearings.

As such, each position of each transmission device lever correlates to a corresponding actuator position. The arrangement of the transducer on a moving part of the transmission now allows an even easier and more accurate way to determine the exact actuating position of the actuator, which has already been mentioned several times. Specifically, this can cause an automatic restriction of defect detection on a part of the transmission device.

Another advantage can be attained if the sensor for an inventive actuating device is configured for at least one of the following signal communication types between the transducer and signal receiver:
Magnetic interaction
Resistive interaction
Induction
Optical interaction
Magnetic interaction The list above is not exhaustive. In particular, non-contact communication in accordance with the invention is used. Communication between the transducer and signal receiver may be unidirectional or multidirectional. For inductive signal communication, the signal receiver may feature an excitation coil that generates a corresponding eddy current field in the transducer. The resulting current flow and associated induction effect in the transducer can now be detected again in a separate area of the signal receiver. This enables detection of the exact actuating position of the actuator for the inventive actuating device. Of course, this type of configuration allows for the use of other solutions, such as a magnetic interaction, particularly when using the Hall effect.

It is also advantageous for the sensor device of an inventive actuating device to be configured for quantitative evaluation of the actuating position of the actuator. This means that an actuator reaching an end position or a defined actuating position is not just detected qualitatively. This system can actually discern the exact position to which the actuator has moved. This includes the corresponding angle position or actual function position of the actuator. The quantitative evaluation makes the sensor device slightly more complex. Nevertheless, this feature provides additional evaluation quality. In addition to the actuating position, the actuating speed can also be detected. A quantitative configuration can also be used to assess the actuating speed or final actuating position to determine the severity of the detected defect. It can be used to detect a full or partial mechanical defect or even wear on individual parts of the inventive actuating device.

Another advantage is provided if at least some sections of the transmission device of an inventive actuating device are configured as a lever mechanism with transmission levers for transmitting the actuating movement. This is an extremely simple and cost-effective solution. The individual transmission levers feature corresponding bearings which can carry out a defined lever or lever swivel movement This ensures that the actuator moves back and forth between the individual actuating positions in a defined actuating movement. Preferably, the lever mechanism in the corresponding transmission lever is designed with the transducer such that at least one part of the moving transmission lever or transmission lever joint can be equipped with the transducer. This causes the transducer to move together with the transmission lever, ensuring the proper inventive function of the device in a simple and cost-effective manner.

Another advantage is provided if the transducer of an inventive actuating device is configured as a limit stop for detecting at least one end position of the actuating device at the end of the actuating movement. This is defined as a qualitative detection in the form of a mechanical switching option for this end position. Of course, a corresponding limit stop can also be provided in two or more end positions. As such, the transducer is simply a corresponding limit stop that interacts with a mechanical signal receiver switch. This means that, if the transducer moves into the corresponding end position, the transducer physically presses against the signal receiver switch, triggering the signal for the end position that was reached. Of course, this can also be combined with more complex correlations between the signal receiver and transducer.

It can also be advantageous for the transmission device for the inventive actuating device to feature a movement interface for securing the actuator used to transmit the actuating movement and for the transmission device and actuating drive to be configured as an assembly. This can further reduce the level of complexity and compact dimensions of an inventive actuating device. This makes it possible to place the transmission device and actuating drive in the same housing so that so that a single assembly unit for this assembly can be used as an assembly component to assemble the vehicle. Existing actuating devices could also be replaced by an inventive actuating device, which would enable an existing device to be retrofitted with the inventive function.

In addition, it is also advantageous for the sensor for an actuating device to feature a control unit for receiving, processing and/or forwarding the signal detected by the signal receiver. This type of control unit can also be used to control active signal receivers accordingly for functions such as inductive signal detection. Preferably, the process of receiving and forwarding signals are basic functions of the control unit. Of course, the control unit can also be configured as a processing unit to carry out at least an initial processing for interpreting the detected signal. In this case, an error signal can be forwarded. A quantitative error signal or corresponding wear indicator may be possible after a successful quantitative analysis.

Another feature of this invention is an actuator system, specifically for vehicles, which features an actuator and actuating device in accordance with this invention. The actuator is installed such that it can be moved between at least two actuating positions and the actuating device features a transmission device that has an operative connection to the actuator for transmitting the actuating movement. As a result, an inventive actuator system offers the same advantages as those that have been described in detail for an inventive actuating device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
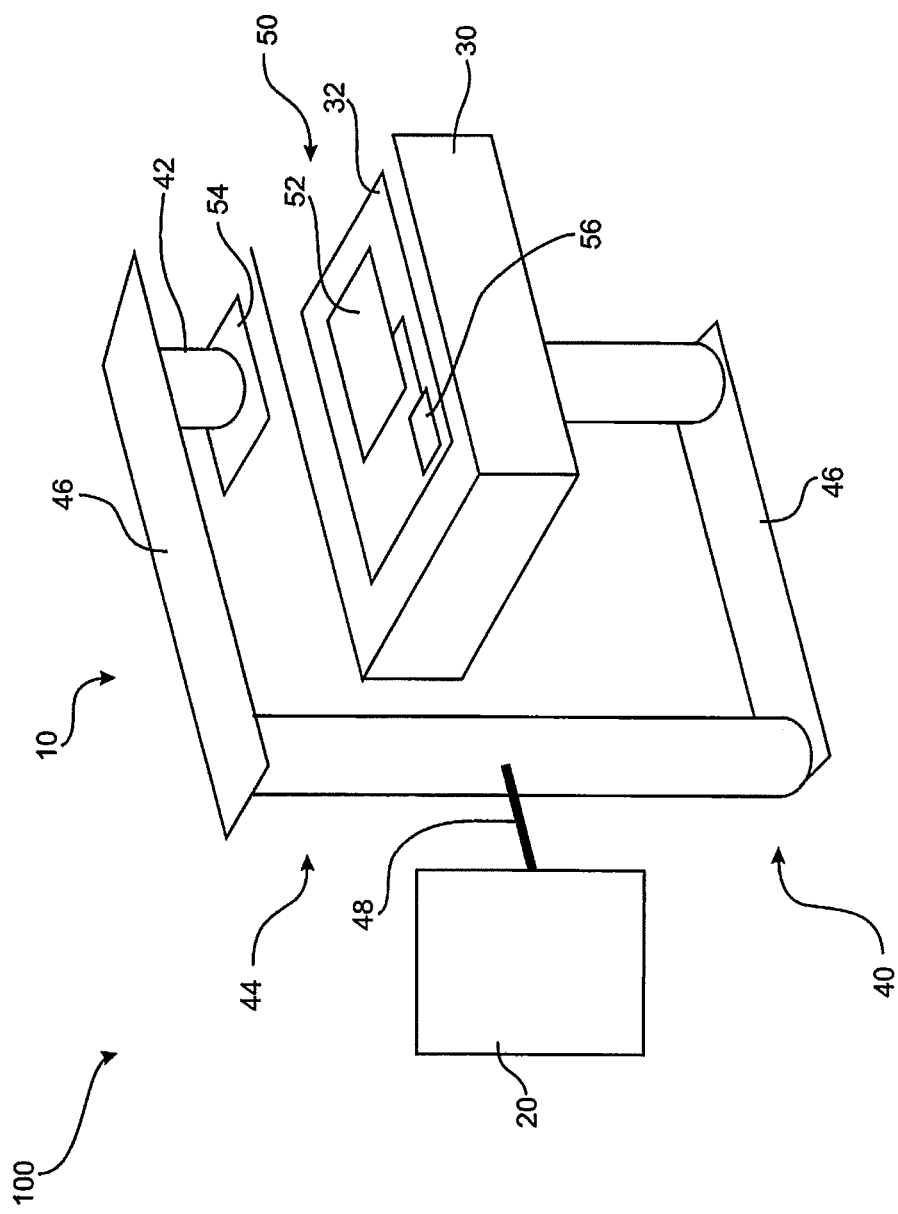
FIG. 1 is an initial design of an inventive actuator system.

FIG. 1 is a schematic of an inventive actuator system (100) with an initial design of an inventive actuating device (10). This actuating device (10) is equipped with a transmission device (40) in the form of a lever mechanism (44). This lever mechanism (44) is equipped with several joints and two transmission levers (46).

An actuating drive (30) is equipped with a servomotor that is not described in detail here. This servomotor carries out a movement of the actuator (20) in the actuator system (100). Then, the actuating movement can be converted into an actuating movement of the actuator (20) via the transmission device (40) and a corresponding movement interface (48). During this actuating movement, the entire lever mechanism (44) and transmission device (40) also move.

As seen in FIG. 1, a transducer (54) in the form of an inductive sensor is arranged on a component (42) of the transmission device (40) in the top right. A signal receiver (52) and corresponding control unit (56) are arranged on a printed circuit board (32) of the actuator (30).

If the transmission device (40), driven by the actuator (30) moves along the path of the actuating movement, this primarily causes the actuator (20) to carry out a corresponding actuating movement. However, the transducer (54) also moves along the path of the actuating movement simultaneously. This actuating movement can be detected by the signal receiver (52) from the changed relative position. As a result, the signal can be processed accordingly by the sensor device (50) in the control unit (56) and then forwarded.

Figure 2:
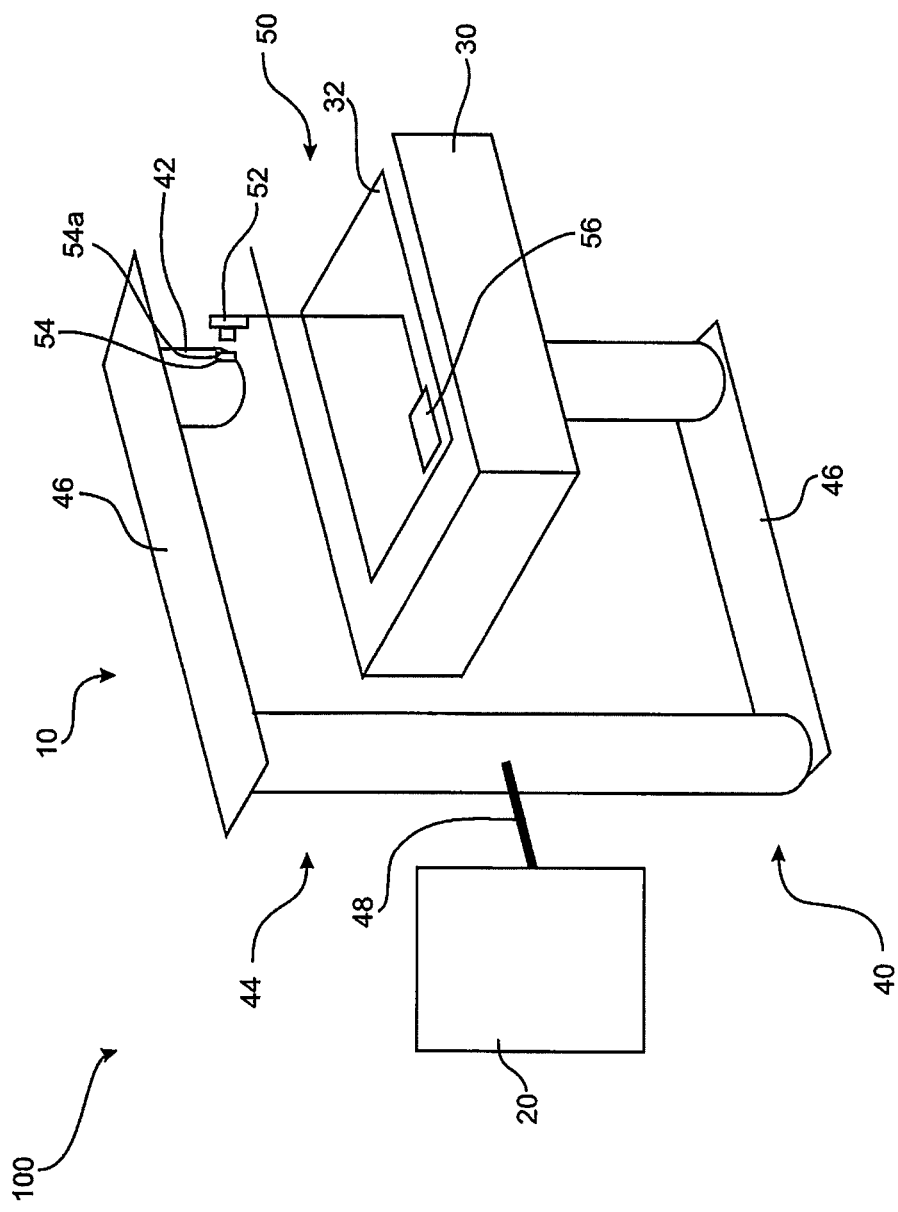
FIG. 2 is an additional design of an inventive actuator system.

FIG. 2 shows an alternative configuration to FIG. 1. The configuration issue of the sensor device (50) is solved using a limit stop, and the transducer (54) forms the limit stop (54a). The signal receiver (52), which protrudes from the printed circuit board (32), is configured as a mechanical pushbutton, allowing the corresponding limit stop to automatically generate the signal to the control unit (56) mechanically. In all other respects, the design in FIG. 2 functions in the same manner that has already been described for FIG. 1.

The previous explanation of the designs only describes this invention using examples. Of course, individual features of these designs can be combined with one another in any way without going beyond the scope of this invention, provided that these features are technologically useful.

REFERENCE NUMERAL LIST

10 Actuating device
20 Actuator
30 Actuating drive
32 Printed circuit board
40 Transmission device
42 Component
44 Lever mechanism
46 Transmission lever
48 Movement interface
50 Sensor device
52 Signal receiver
54 Transducer
54a Limit stop
56 Control unit
100 Actuator system

The invention claimed is:
1. An actuating device for moving an actuator comprising:
an actuating drive for generating an actuating movement of the actuator;
a mechanical and non-electronic transmission device in mechanical connection with the actuator for mechanically transmitting the actuating movement from the actuating drive to the actuator;
a sensor device for detecting the actuating position of the actuator, said sensor device including a signal receiver and a transducer for transmitting a signal communicating with the signal receiver to determine relative positions thereof;
wherein the sensor device is configured for at least one of the following signal communication types between the transducer and signal receiver: magnetic interaction, induction, optical interaction, resistive interaction, and mechanical interaction, wherein the sensor device is configured to evaluate the actuating position of the actuator quantitatively;

wherein the signal receiver is positioned in the actuating device and the transducer is arranged on the transmission device.

2. The actuating device in accordance with claim 1, wherein the actuating drive features a printed circuit board on which the signal receiver is arranged.

3. The actuating device in accordance with claim 1, wherein the transducer is arranged on a component of the transmission device that moves during the actuating movement.

4. The actuating device in accordance with claim 1, wherein at least some sections of the transmission device are configured as a lever mechanism with transmission levers for transmitting the actuating movement.

5. The actuating device in accordance with claim 1, wherein the transducer is configured as a limit stop for detecting at least one end position of the actuating device at the end of the actuating movement.

6. The actuating device in accordance with claim 1, wherein the transmission device features a movement interface for securing the actuator used for transmitting the actuating movement, and that the transmission device and actuating drive are configured as an assembly.

7. The actuating device in accordance with claim 1, wherein the sensor device features a control unit for receiving, processing and/or forwarding the signal detected by the signal receiver.

* * * * *